(12) United States Patent
Kuehl et al.

(10) Patent No.: US 11,491,858 B2
(45) Date of Patent: Nov. 8, 2022

(54) ELECTRICALLY OPERATED VEHICLE AND METHOD FOR OCCUPANT PROTECTION

(71) Applicant: AUDI AG, Ingolstadt (DE)

(72) Inventors: Soenke Kuehl, Dossenheim (DE); Thomas Milde, Wuestenrot (DE); Juergen Stegmaier, Kirchberg (DE); Juergen Gerbrand, Kirchberg an der Murr (DE)

(73) Assignee: AUDI AG, Ingolstadt (DE)

( * ) Notice: Subject to any disclaimer, the term of this patent is extended or adjusted under 35 U.S.C. 154(b) by 146 days.

(21) Appl. No.: 17/023,800

(22) Filed: Sep. 17, 2020

(65) Prior Publication Data

US 2021/0086602 A1 Mar. 25, 2021

(30) Foreign Application Priority Data

Sep. 19, 2019 (DE) .......................... 102019125235.0

(51) Int. Cl.
| | |
|---|---|
| *B60K 1/04* | (2019.01) |
| *B62D 25/04* | (2006.01) |
| *B60R 21/02* | (2006.01) |
| *B60L 3/00* | (2019.01) |

(Continued)

(52) U.S. Cl.
CPC .............. *B60K 1/04* (2013.01); *B60L 3/0046* (2013.01); *B60R 21/02* (2013.01); *B62D 25/025* (2013.01); *B62D 25/04* (2013.01); *B62D 25/20* (2013.01); *B60K 2001/0438* (2013.01)

(58) Field of Classification Search
CPC ....... B60R 21/02; B60R 99/00; B62D 25/025; B62D 25/04; B62D 25/20; B60K 2001/0438
See application file for complete search history.

(56) References Cited

U.S. PATENT DOCUMENTS

| | | | | |
|---|---|---|---|---|
| 8,231,169 B2* | 7/2012 | Leopold | ................. | B62D 25/02 362/495 |
| 8,292,350 B2* | 10/2012 | Li | ......................... | B62D 35/005 296/180.1 |
| 11,267,327 B2* | 3/2022 | Matecki | ................... | B60K 1/04 |

(Continued)

FOREIGN PATENT DOCUMENTS

| | | |
|---|---|---|
| DE | 102006030000 A1 | 1/2008 |
| DE | 102006038256 A1 | 2/2008 |

(Continued)

OTHER PUBLICATIONS

German Search Report dated Jul. 21, 2020 in corresponding German Application No. 102019125235.0; 10 pages; Machine translation attached.

*Primary Examiner* — Drew J Brown
*Assistant Examiner* — Tiffany L Webb
(74) *Attorney, Agent, or Firm* — Maier & Maier, PLLC

(57) ABSTRACT

An electrically operated vehicle having a traction battery installed on the underside of the vehicle and a body side structure which has a door entry region on a lateral rocker panel. The vehicle has at least one shielding element which at least partially closes a free distance between the underside of the vehicle and a vehicle standing plane in the event of battery damage, so that the door entry region is shielded from the damaged traction battery installed on the underside of the vehicle.

10 Claims, 4 Drawing Sheets

(51) Int. Cl.
*B62D 25/02* (2006.01)
*B62D 25/20* (2006.01)

(56) References Cited

U.S. PATENT DOCUMENTS

2009/0165963 A1  7/2009  Nakamura et al.
2014/0367983 A1  12/2014  Capitina
2022/0059894 A1* 2/2022  Stephens ................ B60L 50/66

FOREIGN PATENT DOCUMENTS

| DE | 202006015543 U1 | 2/2008 |
| DE | 202010005999 U1 | 7/2010 |
| DE | 102017205447 A1 | 10/2018 |
| DE | 102018202186 A1 | 8/2019 |
| WO | 2017/149201 A1 | 9/2017 |

* cited by examiner

ELECTRICALLY OPERATED VEHICLE AND METHOD FOR OCCUPANT PROTECTION

FIELD

The invention relates to an electrically operated vehicle and a method for occupant protection.

BACKGROUND

Design measures are to be taken in electrically operated vehicles so that the fire department can evacuate vehicle occupants from the vehicle interior in the event of damage and can drive an extinguishing lance into the battery interior of the traction battery to flood the battery interior with extinguishing agent.

A generic electrically operated two-track vehicle has an installation space for a traction battery which is open toward the bottom of the vehicle in the vehicle vertical direction. The installation space is delimited toward the vehicle top by a floor part forming the vehicle floor. Moreover, the installation space for the traction battery is delimited on both sides in the vehicle transverse direction by lateral rocker panels, which each define the lower edge of a side door cutout of the vehicle. Such a vehicle is known, for example, from DE 10 2017 205 447 A1. At least one door entry region is associated with each of the lateral rocker panels, via which a vehicle occupant can get out of the vehicle or can get into the vehicle.

In the event of a battery fire, the flames can extend from the traction battery on the underside of the vehicle in the vehicle transverse direction up to laterally beyond the rocker panels into the door entry region. In this case, evacuation of the vehicle occupant or the vehicle occupant getting out via the side door cut out of the vehicle can be negatively affected.

A shielding element formed on the vehicle side door is known from US 2014/0367983 A1. A fireproof device is known from US 2009/0165963 A1. A body structure of the vehicle is known from WO 2017/149201 A1.

SUMMARY

The object of the invention is to provide an electrically operated vehicle and a method for occupant protection in the case of which, in the event of damage, a vehicle occupant can get out or evacuate without being negatively affected.

According to the disclosure, the vehicle has at least one shielding element which, in the event of battery damage, essentially bridges or closes a free distance 'a' between the underside of the vehicle and the roadway. In this way, the door entry region is shielded from the damaged traction battery installed on the underside of the vehicle. A vehicle occupant getting out of the vehicle is therefore protected in the event of battery damage from negative effects due to the battery damage, such as the formation of flames, heat generation, and/or outgas sing from the traction battery, so that the vehicle occupant can safely leave the damaged vehicle. In the event of damage, the protective effect of the shielding element can remain permanently or at least temporarily, namely at least until the vehicle occupants have gotten out of the vehicle via the door entry region or have been evacuated from it.

Especially with the traction battery installed on the underside of the vehicle, a battery fire leads to the formation of flames, in which the flames spread laterally outwards in the transverse direction of the vehicle on the underside of the vehicle and protrude beyond the rocker panels. In this case, the shielding element can shield the door entry region from flames.

In one technical implementation, the shielding element can be adjusted between a non-activated stowed position in normal vehicle operation and an activated active position in the event of damage. The shielding element can, for example, be integrated directly into the rocker panel or into the rocker panel trim. Alternatively and/or additionally, the shielding element can be integrated into a vehicle side door.

The shielding element can preferably be integrated into a vehicle protection system together with a damage sensor. If battery damage is detected, the damage sensor generates a damage signal, on the basis of which the shielding element is activated.

It is particularly preferable if the damage sensor is implemented as a battery fire sensor which can detect a battery fire of the traction battery.

In one specific embodiment variant, the shielding element can be implemented like a curtain. It can be folded up in its stowed position in a space-saving manner. In the event of damage, the curtain can unfold to its active position in which the door entry region of the rocker panel is shielded from the underside of the vehicle. The shielding element can preferably extend essentially continuously over the entire rocker panel length between the front wheel arch and the rear wheel arch.

BRIEF DESCRIPTION OF THE FIGURES

Exemplary embodiments of the invention are described hereinafter on the basis of the appended figures.

In the figures.

DETAILED DESCRIPTION

Figure 1:
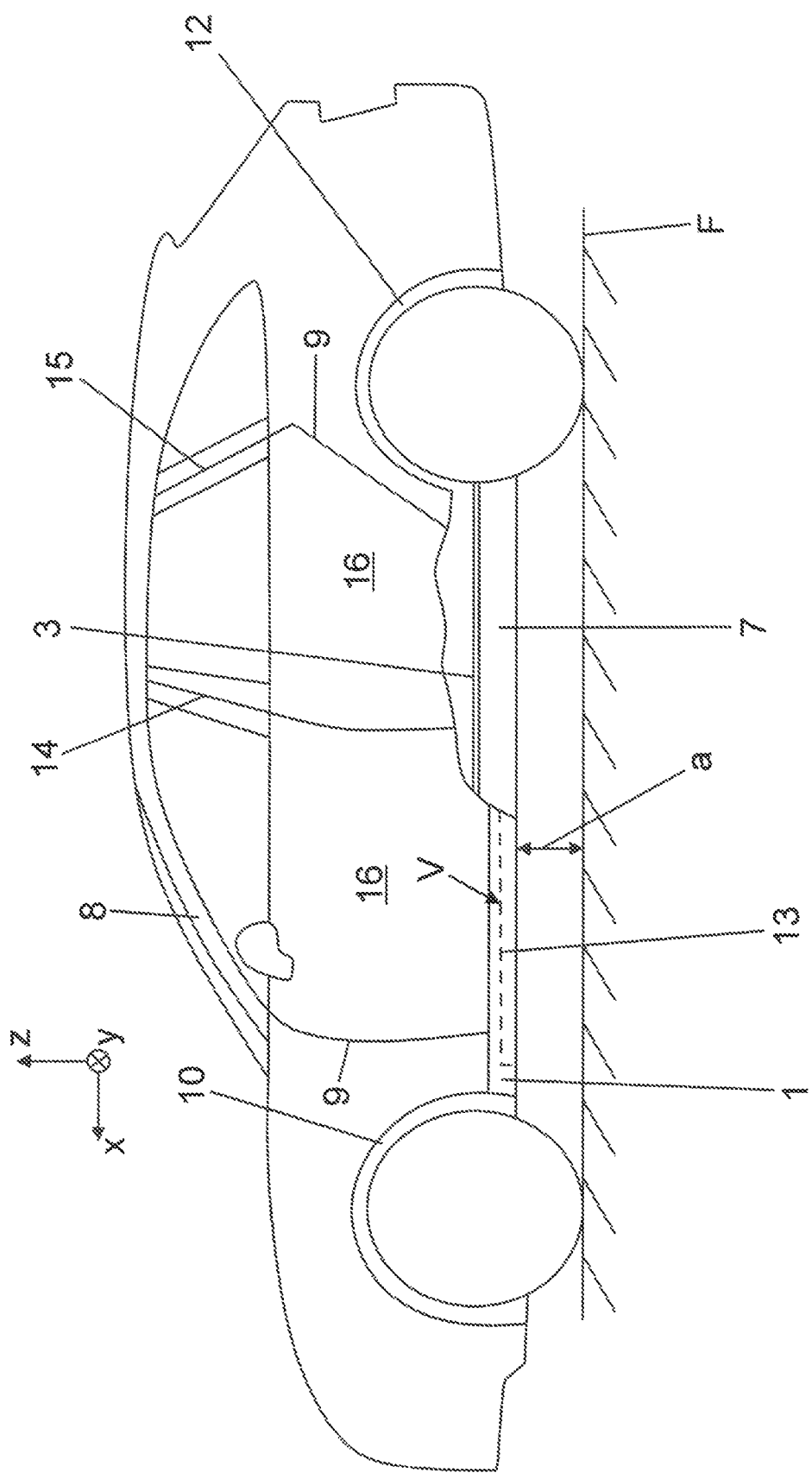
FIG. 1 shows an electrically operated vehicle in a side view with a partial outline.
Figure 2:
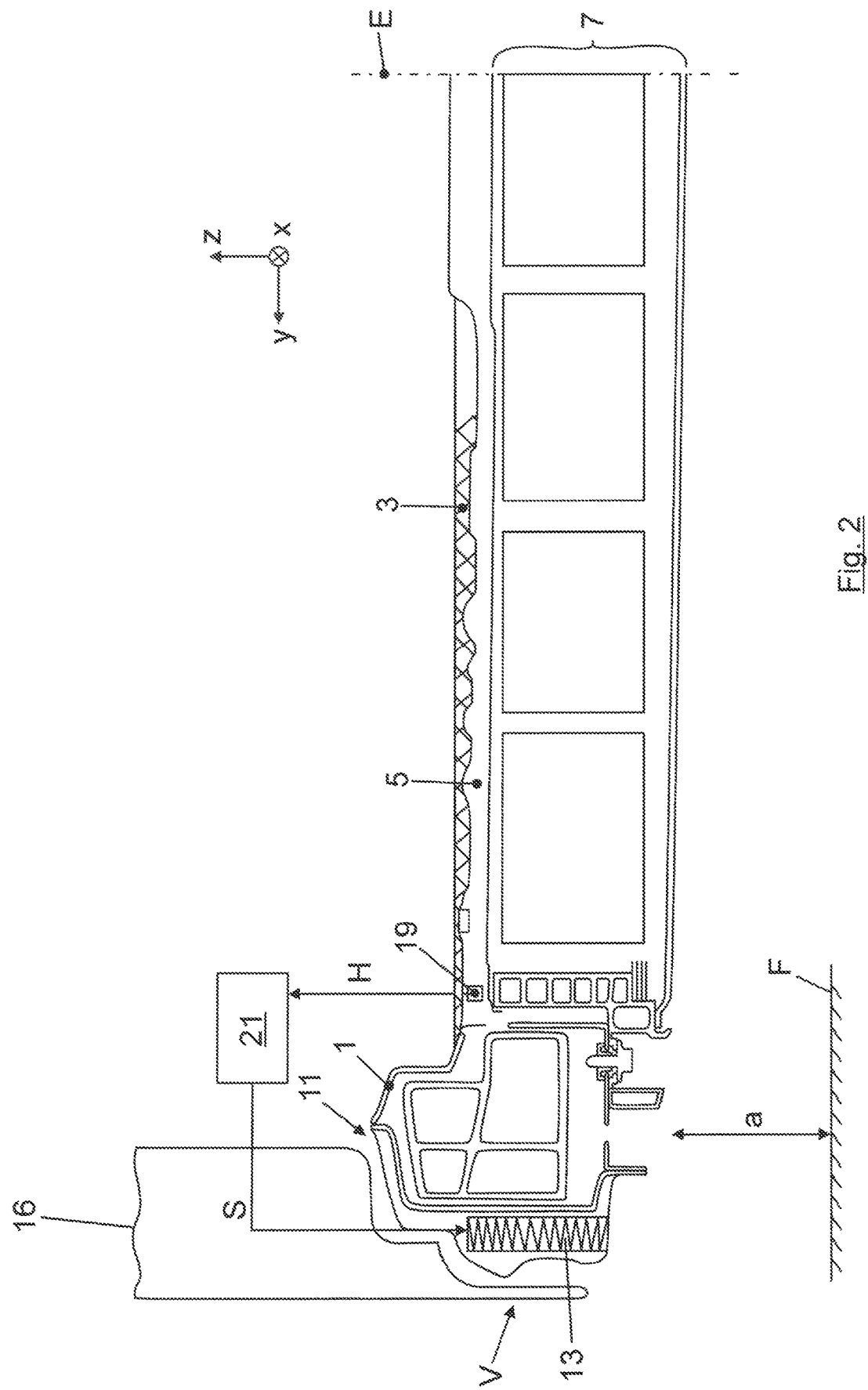
FIG. 2 shows a sectional view along a plane of section yz from FIG. 1.

An electrically operated, two-track vehicle is shown in FIG. 1 in a side view. Accordingly, the vehicle has two lateral rocker panels 1, only one of which can be seen in FIG. 1. A floor part forming a vehicle floor 3 extends between the two rocker panels 1 in the vehicle transverse direction y. In FIG. 2, the floor part delimits an installation space 5 for a traction battery 7 in the vehicle vertical direction z towards the vehicle top. The installation space 5 of the traction battery 7 extends in the vehicle transverse direction y between the two lateral rocker panels 1. Only one half of the vehicle is shown in FIG. 2. The other half of the vehicle is designed to be approximately mirror-symmetrical with respect to the vehicle center longitudinal plane E.

The rocker panel 1 is part of a body side structure and extends in the vehicle longitudinal direction x between the front wheel arch 10 and the rear wheel arch 12 of the vehicle. In addition, between the A pillar 8, the B pillar 14, and the C pillar 15, the rocker panel 1 forms the bottom edge of side door cutouts 9 in which vehicle doors 16 are installed. The rocker panel 1 defines a door entry region 11 (FIG. 2 or 4) in each case on the front side door cutout 9 and on the rear side door cutout 9, via which vehicle occupants can get in and out of the vehicle.

Figure 3:
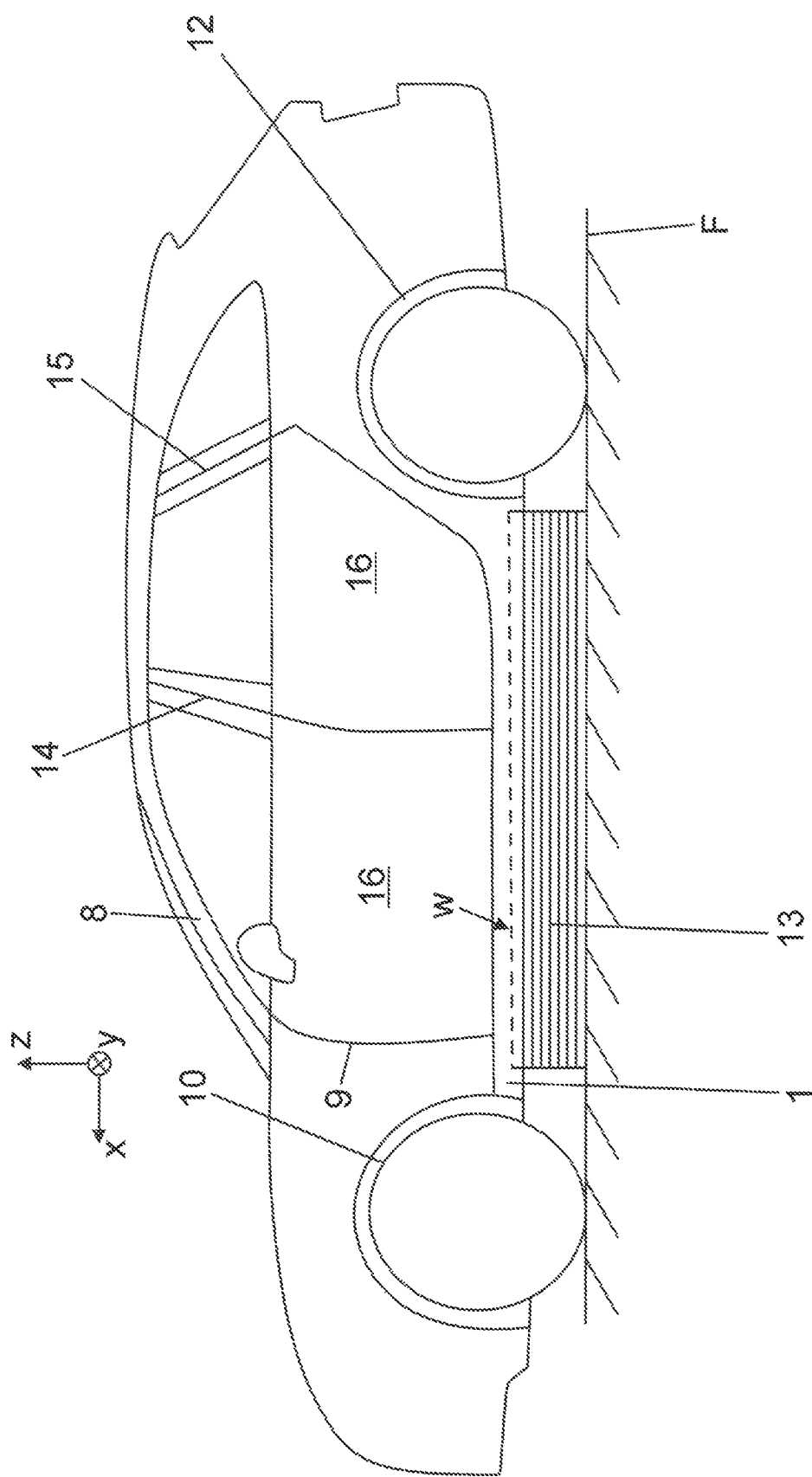
FIG. 3 shows a view corresponding to FIG. 1 with activated shielding element.
Figure 4:
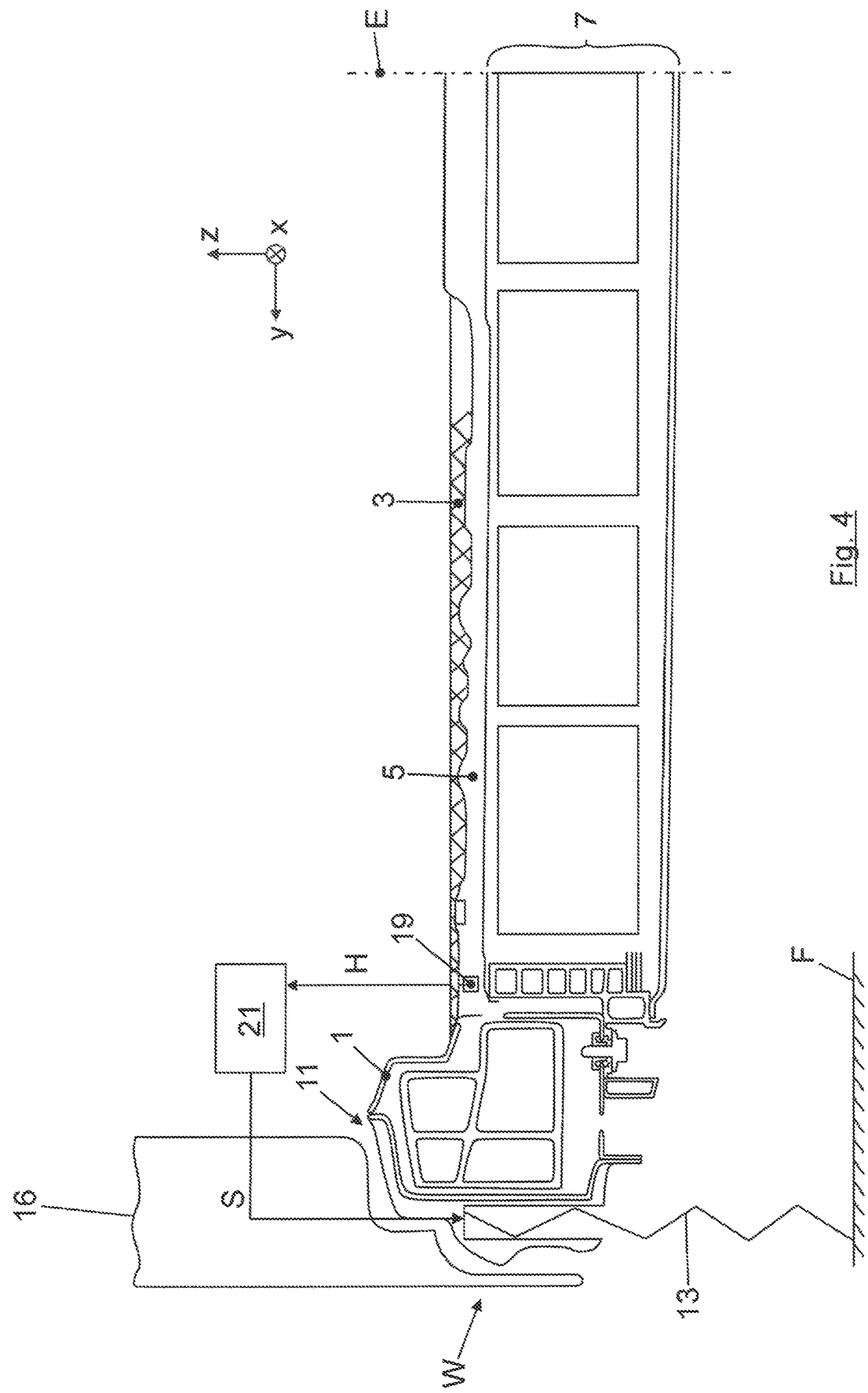
FIG. 4 shows a view corresponding to FIG. 2 with activated shielding element.

In the figures, a shielding element 13, which is part of an occupant protection system, is integrated into the respective rocker panel 1. The shielding element 13 is shown in FIGS. 1 and 2 in its stowed position V, in which it is integrated within the rocker panel 1 or a rocker panel trim in a space-saving manner (for example, folded up). In the event of a battery fire, the shielding element 13 is activated and brought into its active position W (FIG. 3 or 4). In the active position W, the shielding element 13 closes the free distance 'a' between the underside of the vehicle and the vehicle standing plane F like a curtain. Flames spreading from the traction battery 7 in the direction of the door entry region 11 are thus shielded. In this way, the vehicle occupants can safely exit the vehicle via the door entry region 11.

As can be seen from FIG. 3 or 4, the shielding element 13 extends in the vehicle longitudinal direction x over almost the entire rocker panel length between the front wheel arch and the rear wheel arch. The free space between the underside of the vehicle and the vehicle standing plane F in normal operation is almost completely closed laterally to the outside by the shielding element 13 in FIGS. 3 and 4, whereby the door entry region 11 is shielded from negative effects due to the battery damage, for example, due to the formation of flames, heat generation, and/or outgassing.

According to FIG. 2, the shielding element 13 is incorporated into an occupant protection system which additionally has a battery fire sensor 19. The battery fire sensor 19 has a signaling connection to a control unit 21, by means of which the shielding element 13 is activatable. If the battery fire sensor 19 detects the formation of flames in the event of damage, it generates a damage signal H, which is applied to the signal input of the control unit 21. In this case, the control unit 21 activates the shielding element 13 using an activation signal S, so that the shielding element 13 is adjusted from its stowed position V into its active position W, in which the shielding element 13 shields the door entry region 11 of the rocker panel 1 from the underside of the vehicle.

The invention claimed is:

1. An electrically operated vehicle, comprising:
   a traction battery installed on an underside of the vehicle, and
   a body side structure which has a door entry region on a lateral rocker panel,
   wherein the vehicle has at least one shielding element, which at least partially closes a free space between the underside of the vehicle and a vehicle standing plane in response to battery damage of the traction battery, so that the door entry region is shielded from the battery damage.

2. The vehicle as claimed in claim 1, wherein the battery damage comprises at least one of: formation of flames, heat generation, and outgas sing.

3. The vehicle as claimed in claim 1, wherein the vehicle has an installation space for the traction battery which is open to a vehicle bottom in a vertical direction of the vehicle and which extends in a vehicle transverse direction to the body side structure.

4. The vehicle as claimed in claim 1, wherein the at least one shielding element is configured to shield the door entry region for a predetermined duration of time.

5. The vehicle as claimed in claim 1, wherein the at least one shielding element is adjustable between a non-activated stowed position in normal vehicle operation and an activated active position in response to the battery damage, and
   wherein the at least one shielding element at least partially encloses the free distance between the underside of the vehicle and a roadway.

6. The vehicle as claimed in claim 1, wherein the at least one shielding element is integrated into at least one of the body side structure and the lateral rocker panel.

7. The vehicle as claimed in claim 1, wherein the vehicle further comprises a protective system comprising at least one damage sensor, and
   wherein the at least one shielding element is activated in response to the at least one damage sensor detecting the battery damage.

8. The vehicle as claimed in claim 1, wherein the rocker panel extends between a front wheel arch and a rear wheel arch of the vehicle.

9. The vehicle as claimed in claim 1, wherein the at least one shielding element is packed in a space-saving manner in a stowed position and unfolds into an active position in response to the battery damage.

10. A method for protecting a vehicle occupant of an electrically operated vehicle, the method comprising:
    detecting battery damage of a traction battery, and
    deploying at least one shielding element to shield a door entry region from the battery damage,
    wherein the electrically operated vehicle comprises:
    the traction battery, which is installed on an underside of the vehicle;
    a body side structure, which has the door entry region on a lateral rocker panel; and
    the at least one shielding element,
    wherein the at least one shielding element at least partially closes a free space between the underside of the vehicle and a vehicle standing plane in response to the battery damage, so that the door entry region is shielded from the battery damage.

* * * * *